(12) United States Patent
Wallerström

(10) Patent No.: US 10,451,396 B2
(45) Date of Patent: Oct. 22, 2019

(54) DEVICE AND METHOD FOR MEASURING ANGLES AND CONVEYING THESE MEASUREMENTS TO A PROCESSING APPARATUS

(71) Applicant: Peter Wallerström, Luleå (SE)

(72) Inventor: Peter Wallerström, Luleå (SE)

( * ) Notice: Subject to any disclaimer, the term of this patent is extended or adjusted under 35 U.S.C. 154(b) by 0 days.

(21) Appl. No.: 15/117,191

(22) PCT Filed: Feb. 7, 2015

(86) PCT No.: PCT/SE2015/000006
§ 371 (c)(1),
(2) Date: Aug. 6, 2016

(87) PCT Pub. No.: WO2015/119550
PCT Pub. Date: Aug. 13, 2015

(65) Prior Publication Data
US 2016/0349033 A1     Dec. 1, 2016

(30) Foreign Application Priority Data

Feb. 8, 2014    (SE) ...................................... 1400065

(51) Int. Cl.
*G01B 3/56*     (2006.01)
*B23D 59/00*     (2006.01)
*E04F 21/00*     (2006.01)

(52) U.S. Cl.
CPC ........... *G01B 3/563* (2013.01); *B23D 59/001* (2013.01); *G01B 3/56* (2013.01); *B23D 59/00* (2013.01); *E04F 21/0069* (2013.01)

(58) Field of Classification Search
CPC ...... B23D 59/00; B23D 59/001; G01B 3/563; G01B 3/56; E04F 21/0069
USPC ............ 33/27.02, 27.03, 342, 343, 471, 501
See application file for complete search history.

(56) References Cited

U.S. PATENT DOCUMENTS

| | | | | |
|---|---|---|---|---|
| 94,814 A * | 9/1869 | Fales | ....................... | E04F 21/26 33/462 |
| 185,504 A * | 12/1876 | Bevels | .................... | E04F 21/26 33/461 |
| 761,272 A * | 5/1904 | Wagniere et al. | ........ | G01B 3/56 33/465 |

(Continued)

*Primary Examiner* — Justin Seo
*Assistant Examiner* — Tania C Courson

(57) ABSTRACT

The present invention consists of a device (1) suitable for use during molding work for the measurement of at least one angle formed by at least one first surface and at least one second surface and for conveying the angle or angles to cutting equipment for the adjustment of cutting angles. The device is comprised of at least one first arm (2) and at least one second arm (3) which are connected to each other via at least one connecting device (4) and pivotally arranged in relation to each other via at least one first axis of rotation (5) and that the device (1) includes at least one angle indicator (36) with which the mutual angle between the first arm (2) and the second arm (3) is measured. The device (1) includes at least one unit which indicates a part of angle (V), preferably half of the angle (V), between the first arm (2) and the second arm (3) and that this unit is suitable for use in the adjustment of the angle in a cutting machine. The present invention also concerns a method for use of the device.

5 Claims, 17 Drawing Sheets

(56) References Cited

U.S. PATENT DOCUMENTS

| | | | | |
|---|---|---|---|---|
| 832,483 A * | 10/1906 | Johnson | G01B 3/563 | 33/471 |
| 896,847 A * | 8/1908 | Messner | E04F 21/26 | 33/462 |
| 1,329,005 A * | 1/1920 | Neumaier | G01B 3/563 | 33/465 |
| 1,440,284 A * | 12/1922 | Engstrom | G01B 3/16 | 33/471 |
| 1,585,563 A * | 5/1926 | Schlattau | G01B 3/00 | 33/471 |
| 1,947,448 A * | 2/1934 | Ahola | G01B 3/563 | 33/465 |
| 3,003,244 A * | 10/1961 | Fogliano | G01B 3/56 | 33/341 |
| 3,623,231 A * | 11/1971 | Holt | G01B 3/56 | 33/538 |
| 3,991,474 A * | 11/1976 | Rath | B43L 7/12 | 33/462 |
| 4,223,445 A * | 9/1980 | Goodland | G01B 3/00 | 33/194 |
| 4,394,801 A * | 7/1983 | Thibodeaux | G01B 3/56 | 33/451 |
| 4,813,149 A * | 3/1989 | Herkimer | B25H 7/00 | 33/451 |
| 5,020,233 A * | 6/1991 | Syken | B43L 7/12 | 33/418 |
| 6,532,675 B2 * | 3/2003 | Letourneau | G01C 9/12 | 33/277 |
| 6,543,144 B1 * | 4/2003 | Morin | G01B 3/02 | 33/27.032 |
| 6,877,238 B2 * | 4/2005 | Kanaga | B23D 59/002 | 33/455 |
| 6,954,990 B2 * | 10/2005 | Ellis | G01B 3/563 | 33/424 |
| 6,978,550 B2 * | 12/2005 | Xieh | B43L 7/10 | 33/27.02 |
| 7,574,813 B1 * | 8/2009 | Boutan | E04F 21/0069 | 33/471 |
| 9,199,371 B2 * | 12/2015 | Kim | B25H 7/04 | |
| 9,861,217 B1 * | 1/2018 | Ingels | A47G 1/18 | |
| 9,931,885 B1 * | 4/2018 | Pierson | G01B 3/563 | |
| 2002/0152621 A1 * | 10/2002 | Letourneau | G01C 9/12 | 33/277 |
| 2007/0022856 A1 * | 2/2007 | Paine | B25H 7/00 | 83/522.11 |
| 2016/0238365 A1 * | 8/2016 | Wixey | G01B 3/563 | |

\* cited by examiner

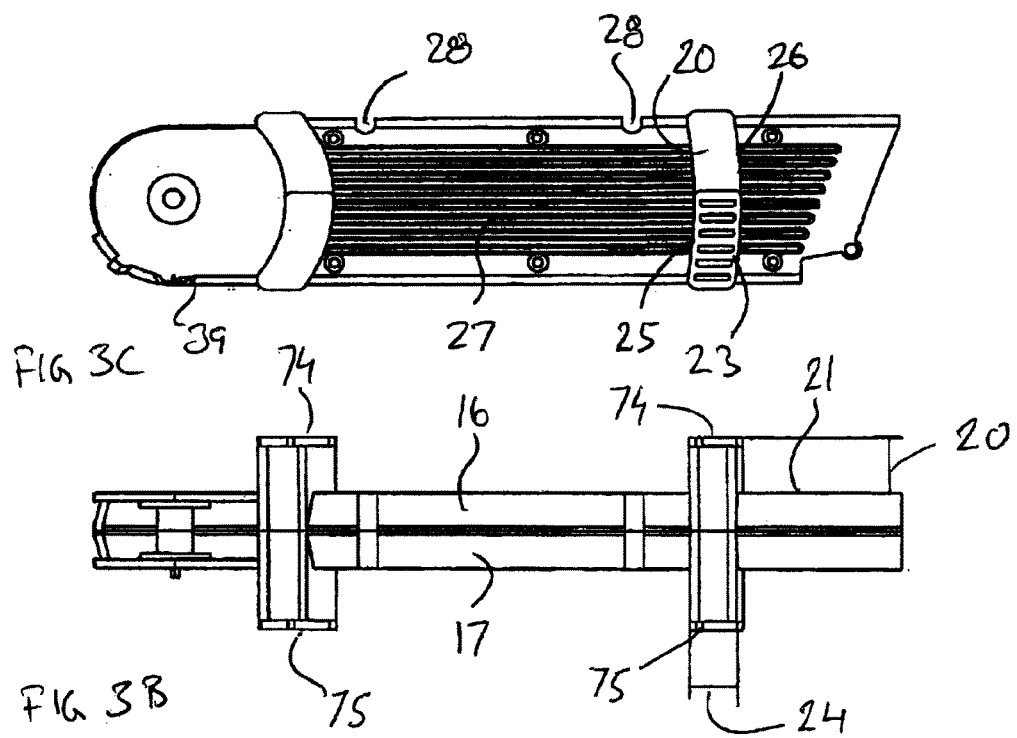
FIG 3C
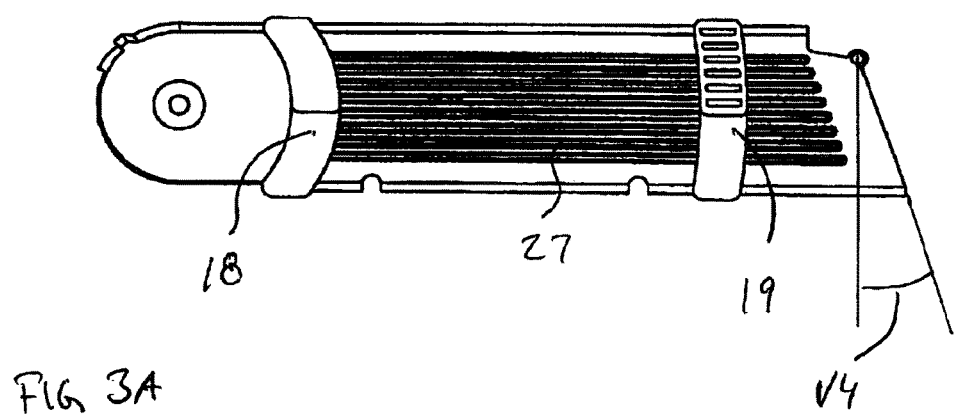
FIG 3B
FIG 3A

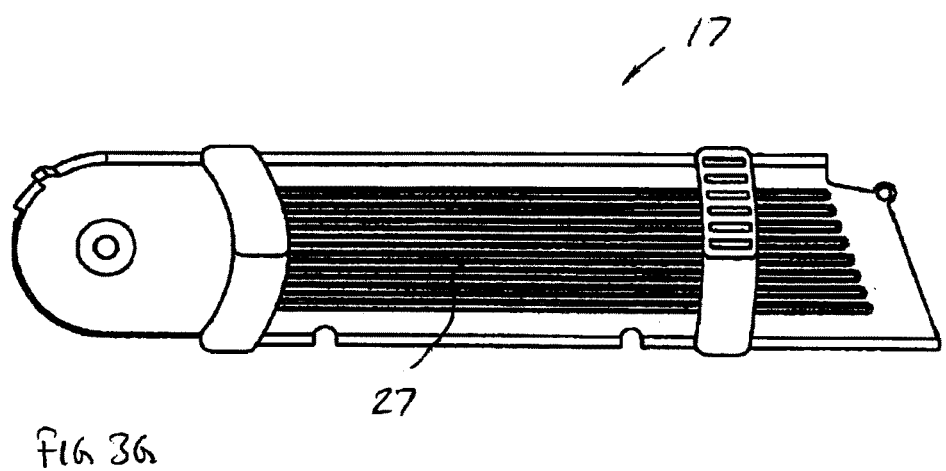
FIG 3G
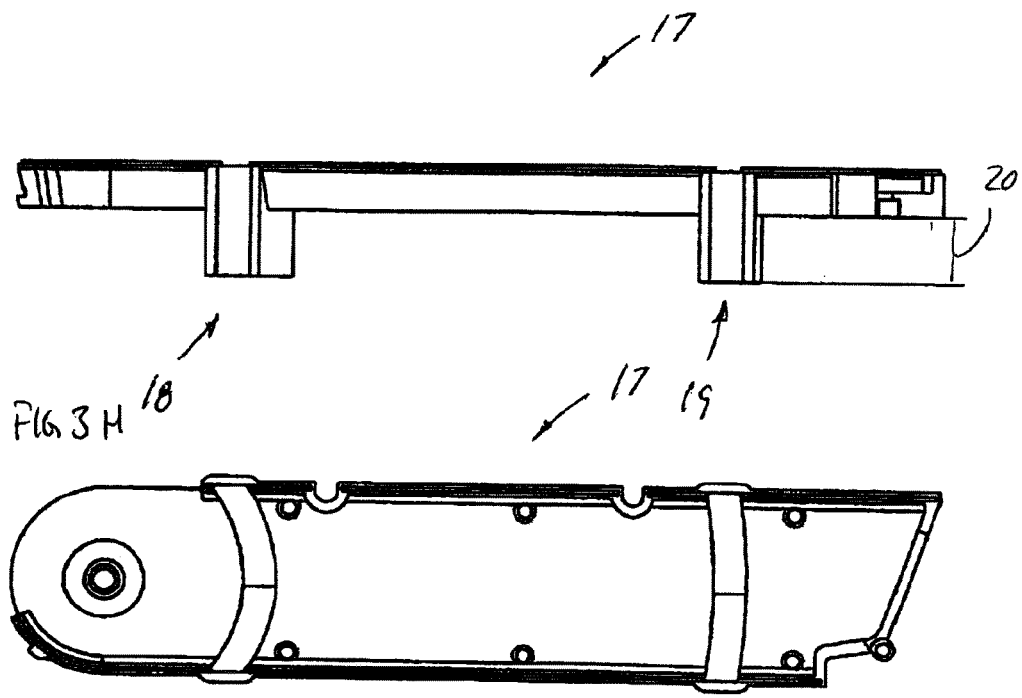
FIG 3H
FIG 3I

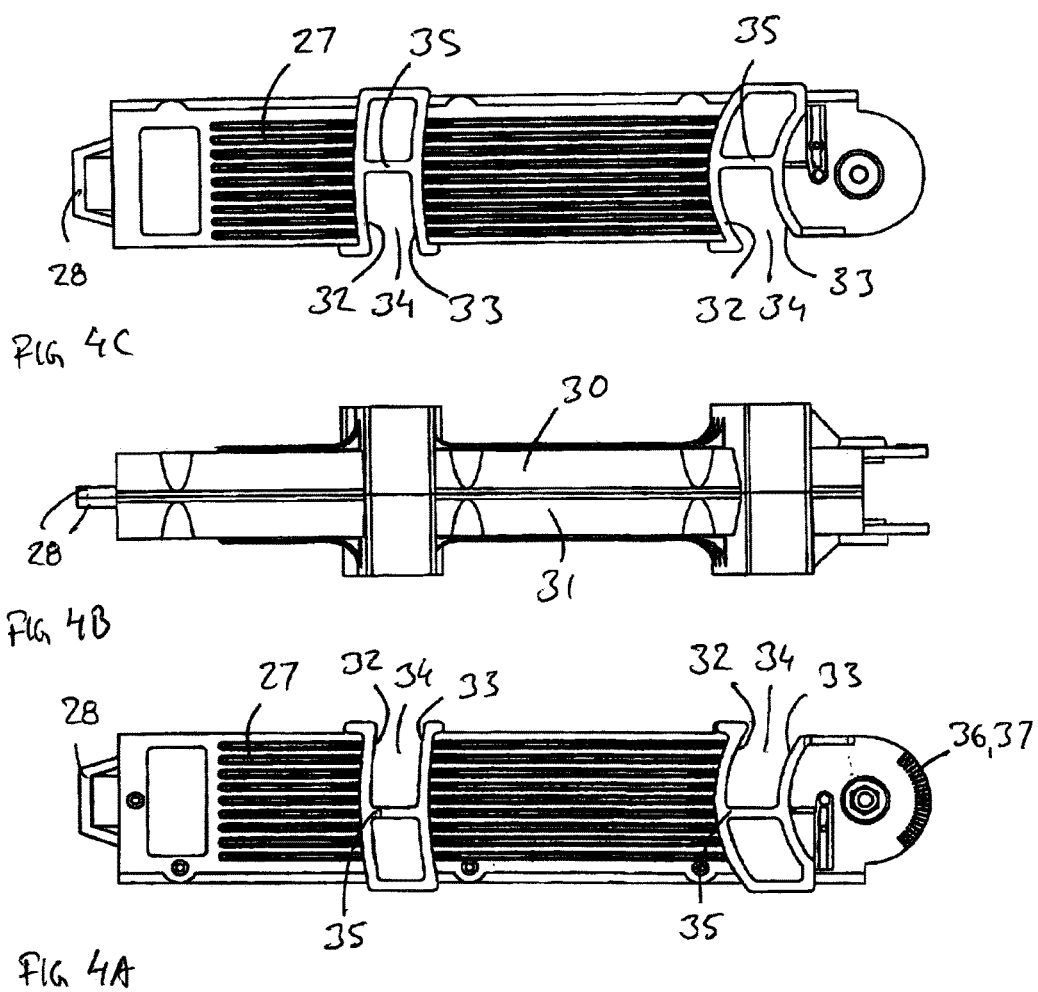

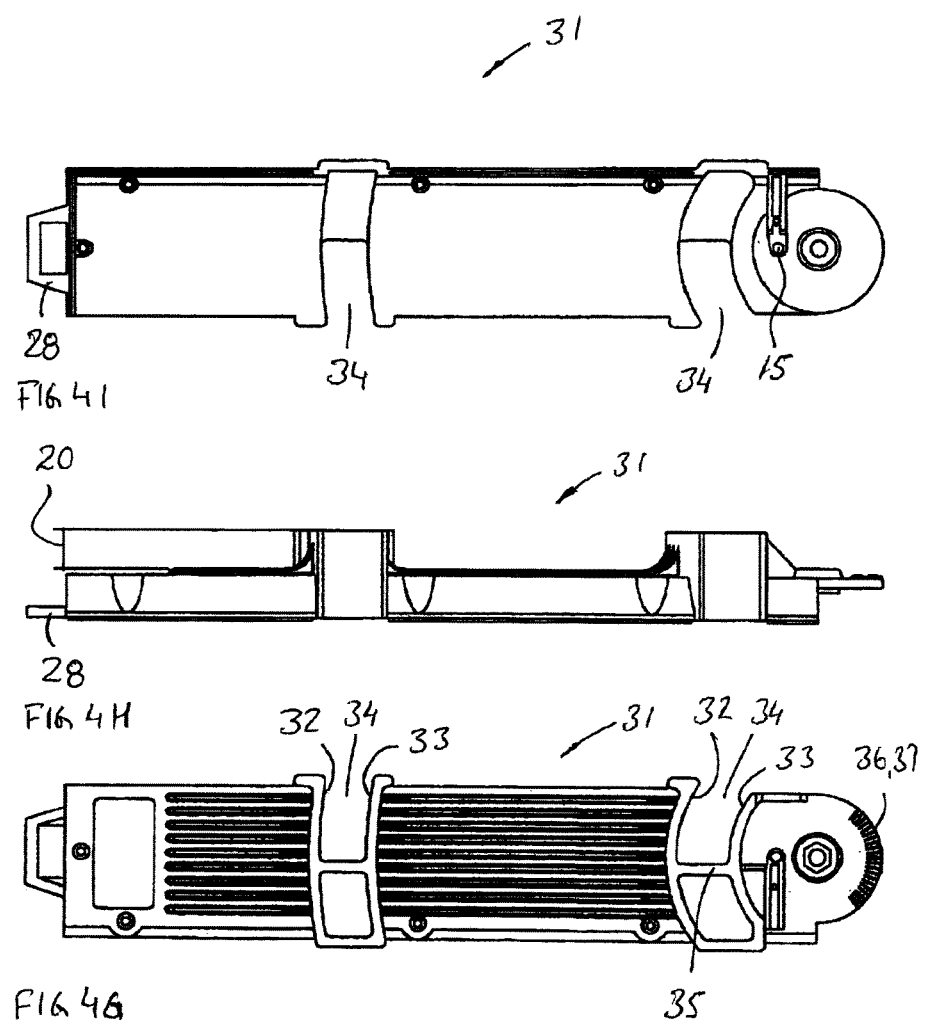

DEVICE AND METHOD FOR MEASURING ANGLES AND CONVEYING THESE MEASUREMENTS TO A PROCESSING APPARATUS

FIELD OF THE INVENTION

The present invention concerns a device and method for measuring at least one angle and the conveyance of this angle to a processing (shaping, working, sawing, milling, mitering, cutting or similar) machine/device in accordance with the claims.

BACKGROUND OF THE INVENTION

In several different circumstances there exists a need to measure angles and to use these measured angles for the adjustment of cutting machines or other types of processing machines. This need arises in numerous situations. For example, this need is present during the sawing/cutting and mitering of molding (moulding, trim, cornice) and similar types of work.

Several problems arise during the sawing/cutting and mitering of molding. Problems exist for example in measuring angles in corners or other places or positions, where two mutually angled moldings are to be joined together, and then conveying these measurements when cutting and mitering these moldings. Normally these moldings are cut in such a way that the joints between these moldings (when the moldings are joined together) do not exactly match up, which results in the joints being perceived as less esthetically pleasing.

Problems associated with measuring or estimating the angles that the molding is to be cut to, are especially significant when ceiling molding (crown molding, cornice), classic molding or similar types of molding are used during the installation of molding. The stated problems with measuring these angles usually results in the need for repeated cutting (mitering), causing waste, before the molding is correctly cut and an acceptable finish is obtained.

Even if correct angles are measured, there still exist problems with conveying the measured angles to the cutting angles of cutting (mitering) machines. It is not uncommon that correctly measured angles are incorrectly conveyed to a cutting machine which in turn results in waste and disposal of molding. Problems with adjusting cutting machines to correct angles are especially great during the cutting of moldings such as ceiling molding (crown molding, cornice), classic molding or similar types of molding.

Equipment and methods for measuring and cutting molding to certain angles are previously known to exist in several different variants. In order to minimize the risk of measuring and cutting molding incorrectly, it is for example common to make templates, of the same type of molding to be cut, of inner and outer corners. This method may be satisfactorily used as long as the angles are perpendicular, but this is often not the case.

A variant of equipment for measuring angles in corners and the like is described in U.S. Pat. No. 7,574,813. This design according to its description includes a first arm and a second arm, which are pivotally arranged relative each other. When measuring an angle, the first arm and the second arm are laid against their respective surfaces that make up the angle which is to be measured. The angle between the first arm and the second arm are displayed digitally via a display. This design, according to its description, differs significantly from the present invention. For example, this design only includes a function for measuring angles and not a function with which the device may be used for the adjustment of cutting angles in a cutting machine.

Another example of equipment with which angles may be measured is described in US20080250905. This description teaches a variant of mitering equipment used for cutting ceiling molding (crown molding, cornice) and even a device for mounting molding such as ceiling (crown) molding and similar on ceilings. The described design differs greatly from the design in accordance with present invention.

A further example of equipment which may be used to measure angles in corners and similar is described in GB2248505. This design includes a bevelling protractor with which the angle is measured and a function for dividing the measured angle. This design, according to its description, is not suitable to be used for both the measurement of angles and for the adjustment of cutting equipment, whereby it differs greatly from the design according to the present invention.

A yet further example of equipment with which angles may be measured is described in DE102007003420 and U.S. 66/004,294. These designs consist of variants of bevelling rules. The described designs differ greatly from the design in accordance with present invention.

A still further example of equipment which may be used to measure angles is described in US20040237320. Even this design differs greatly from the design in accordance with present invention.

PURPOSE OF THE INVENTION

The main purpose of the present invention is to create an improved device that may be used to both measure at least one angle and also to use this measurement for the adjustment of processing machines (equipment), which solves or reduces at least one of the above mentioned problems. This purpose is solved with a device and a method in accordance with the claims.

BRIEF DESCRIPTION OF THE DRAWINGS

The present invention will be described in greater detail in the following detailed description with reference to the accompanying schematic drawings that in an exemplifying purpose show the current preferred embodiments of the present invention.

FIGS. 3A to 3C show the first arm, the inner box.

FIGS. 3G to 3I show the second lid of the inner box.

FIGS. 4A to 4C show the second arm, the outer box.

FIGS. 4G to 4I show the second lid of the inner box.

DETAILED DESCRIPTION OF THE INVENTION

Figure 1A:
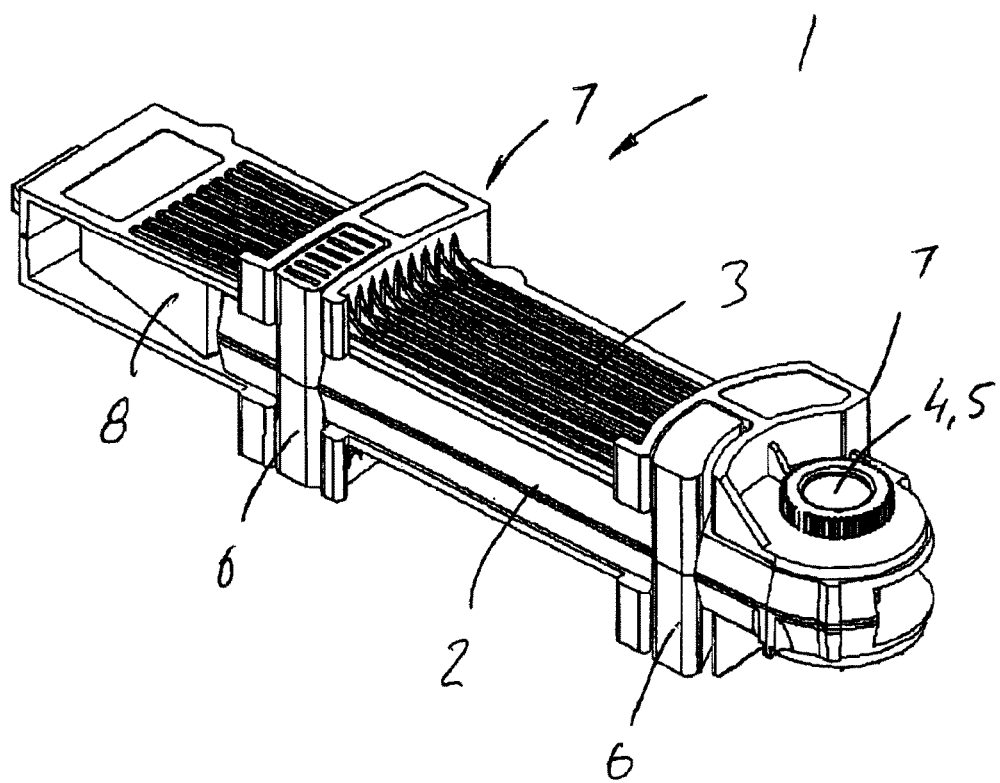
FIGS. 1A to 1D show a device in accordance with a first embodiment seen in perspective. The device is shown folded together.
Figure 1B:
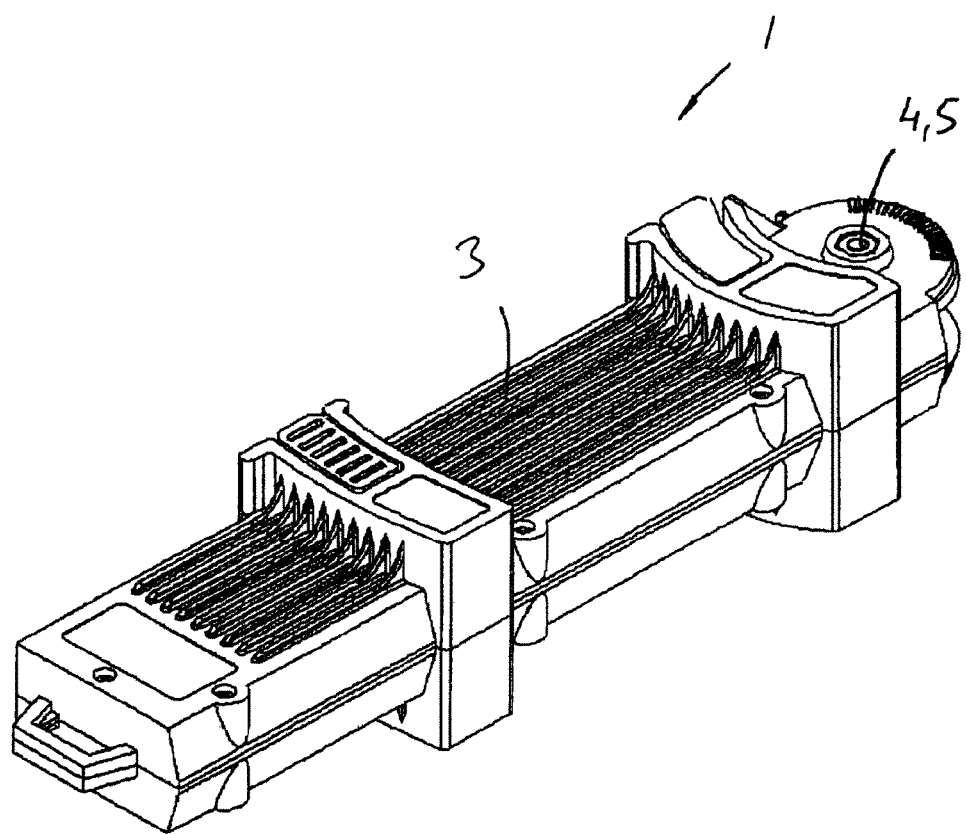
Figure 1C:
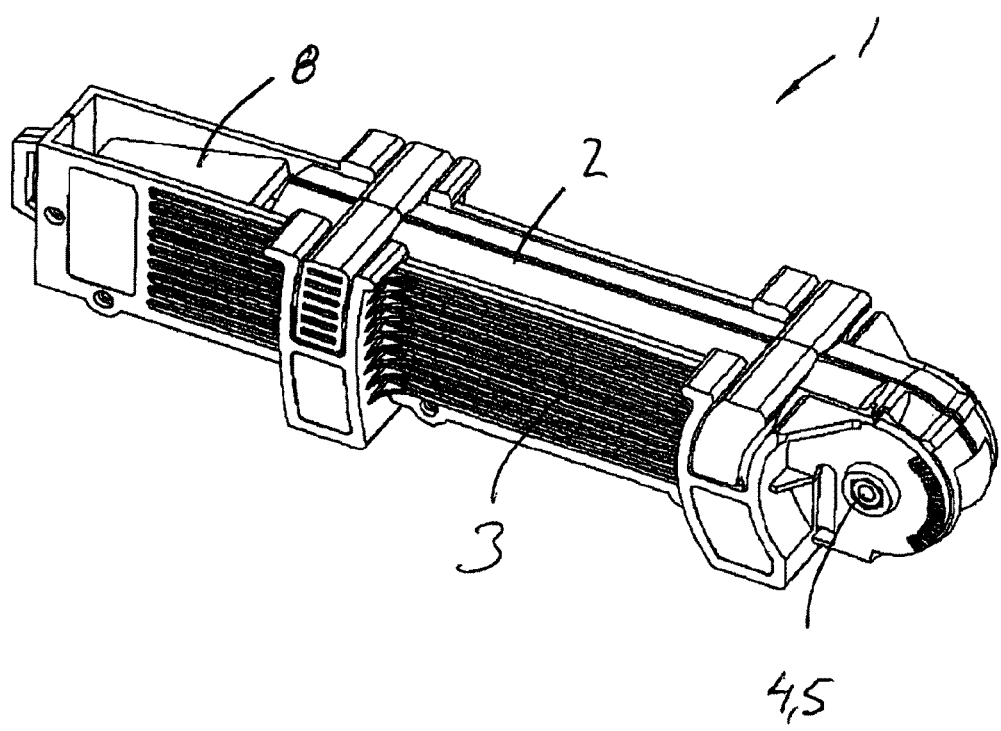
Figure 1D:
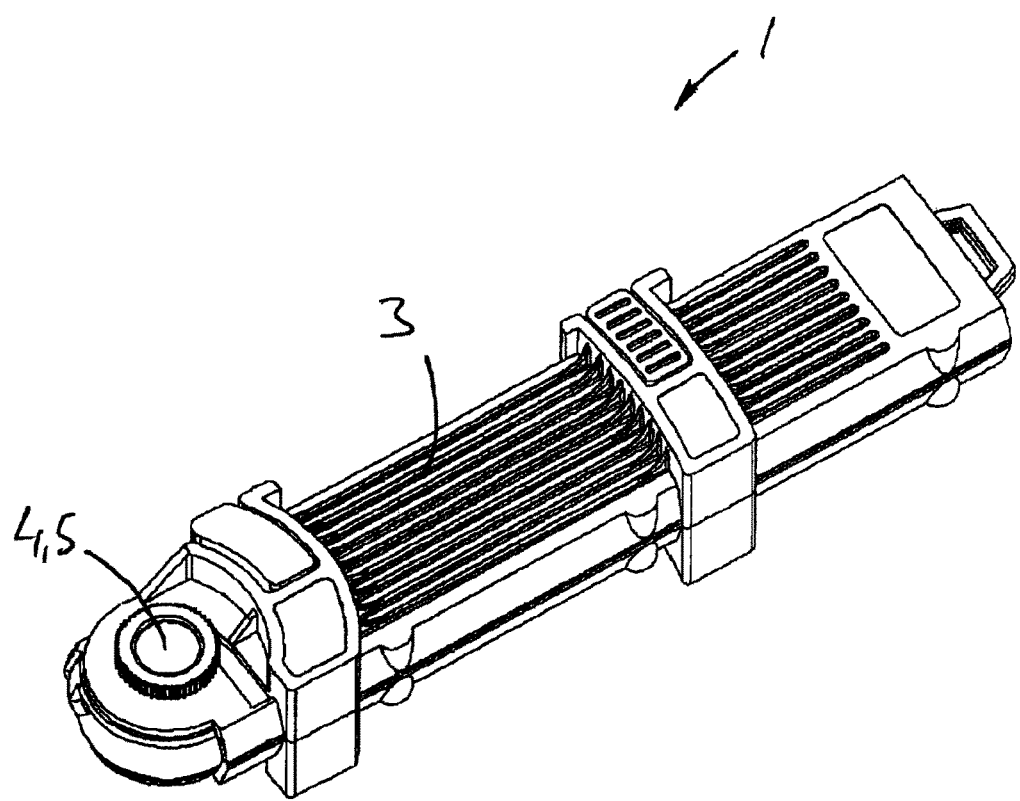

With reference to the figures, a device 1 for measuring at least one angle, or several angles, and for conveying the entire or a portion of this angle (these angles) to cutting equipment (machine) or other type of processing equipment (miter saw) is shown in accordance with the present patent application.

The present device 1 may be used in several different applications where at least one angle V, formed by at least one first surface and at least one second surface, is measured and conveyed to cutting equipment (cutting machine) or other type of processing equipment. In the exemplifying embodiment, the device 1 is preferably suitable for use in conjunction with the cutting of molding (trim) such as ceiling (crown) molding (cornice) and the like.

The device 1 consists of at least one first arm 2 and at least one second arm 3 which during measurement of one or more angles are connected (joined) to each other with at least one connecting device (coupling device, joining device, pivot hinge) 4. The first arm 2 and the second arm 3 are pivotally arranged in relation to each other via at least one axis of rotation 5. The first arm's 2 and the second arm's 3 maximum angle of rotation may vary within the scope of the present invention. The first arm 2 and the second arm 3 have lengths that are essentially longer than the first arm's 2 and the second arm's 3 widths. The first arm 2 and the second arm 3 may thus be of an elongated shape and consist of elongated bodies. The first arm 2 includes at least one first contact surface (contact surfaces in the embodiment) 6 suitable for resting (laying) against the first surface (surfaces) and the second arm 3 includes at least one second contact surface 7 (contact surfaces in the embodiment) against at least one second surface. The contact surfaces 6 and 7 are for example used for measuring inner corners and the like. Further, the design includes at least one third contact surface 72 (contact surfaces in the embodiment) and at least one fourth contact surface (contact surfaces in the embodiment) 73. The contact surfaces 72 and 73 are for example used for measuring outer corners and the like. Further, the design includes at least one third contact surface (contact surfaces in the embodiment) 74 and at least one fourth contact surface (contact surfaces in the embodiment) 75. The contact surfaces 74 and 75 are for example placed against ceilings or other surface in conjunction with the measurement of inner (inside) or outer (outside) corners.

In the first embodiment shown in FIGS. 1A to 2C, the first arm 2 and the second arm 3 are mainly to be used pivotally connected to each other. The connecting device (coupling device, joining device, pivot hinge) 4 in the first embodiment consists of at least one screw, axle (pin, hinge) or the like which connects the first arm 2 and the second arm 3.

Preferably the device includes a function with which the first arm's 2 and the second arm's 3 mutual positions may be locked in place relative each other.

Figure 2A:
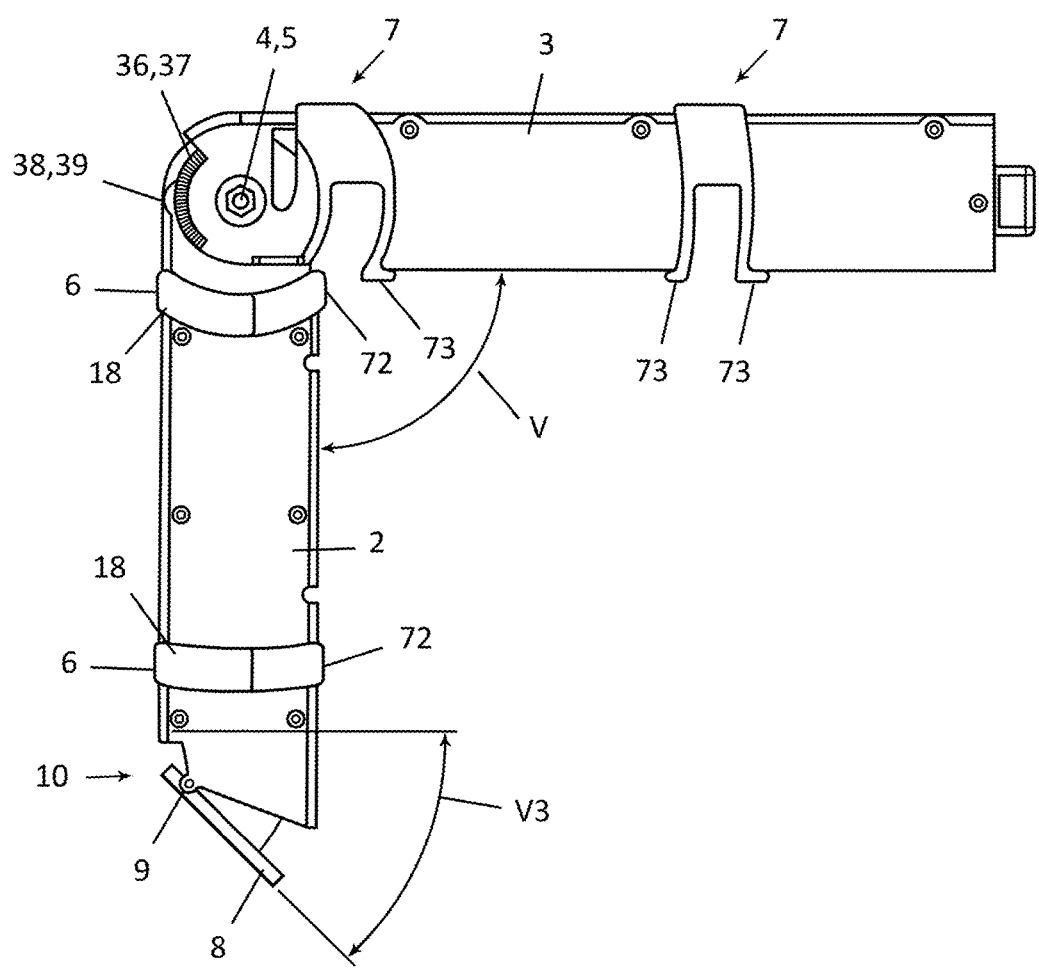
FIGS. 2A to 2C show the present device with different reciprocal angles between the first arm and the second arm.
Figure 2B:
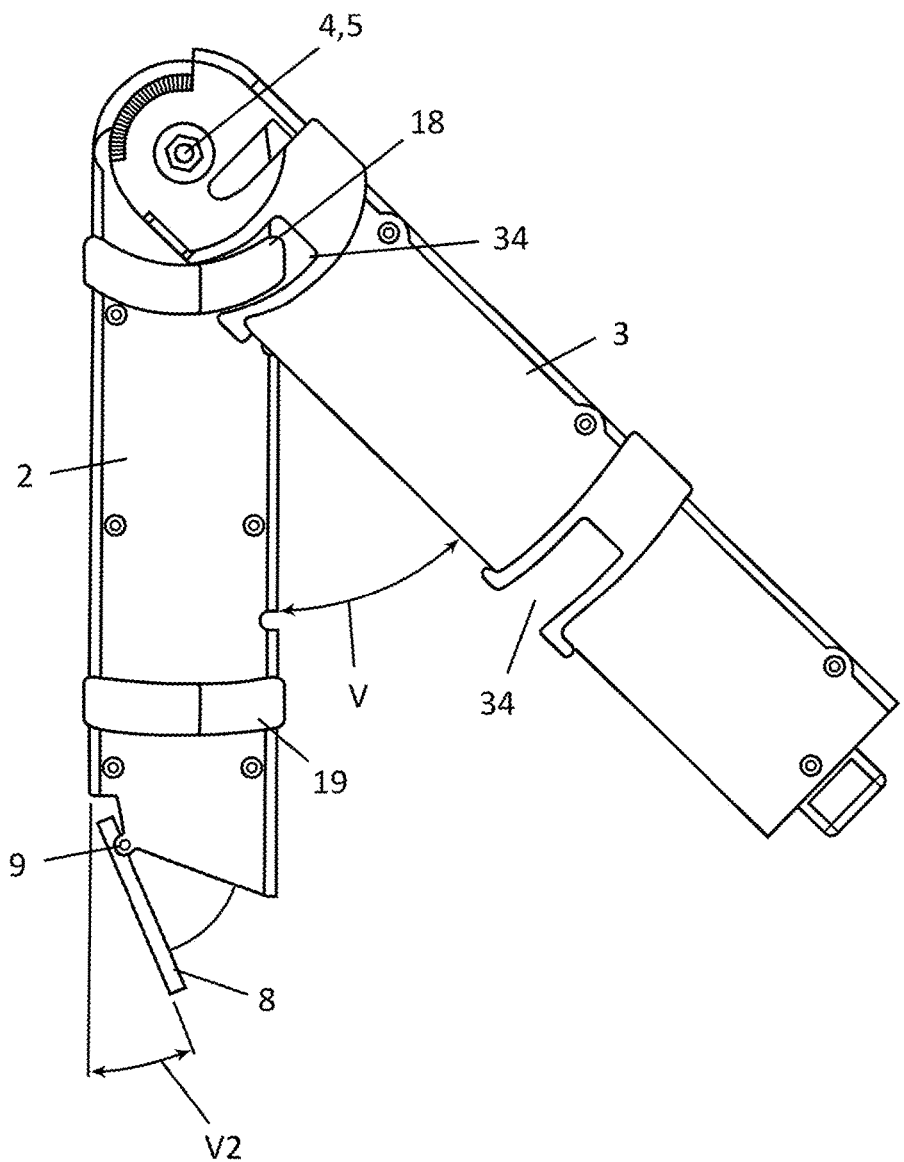
Figure 2C:
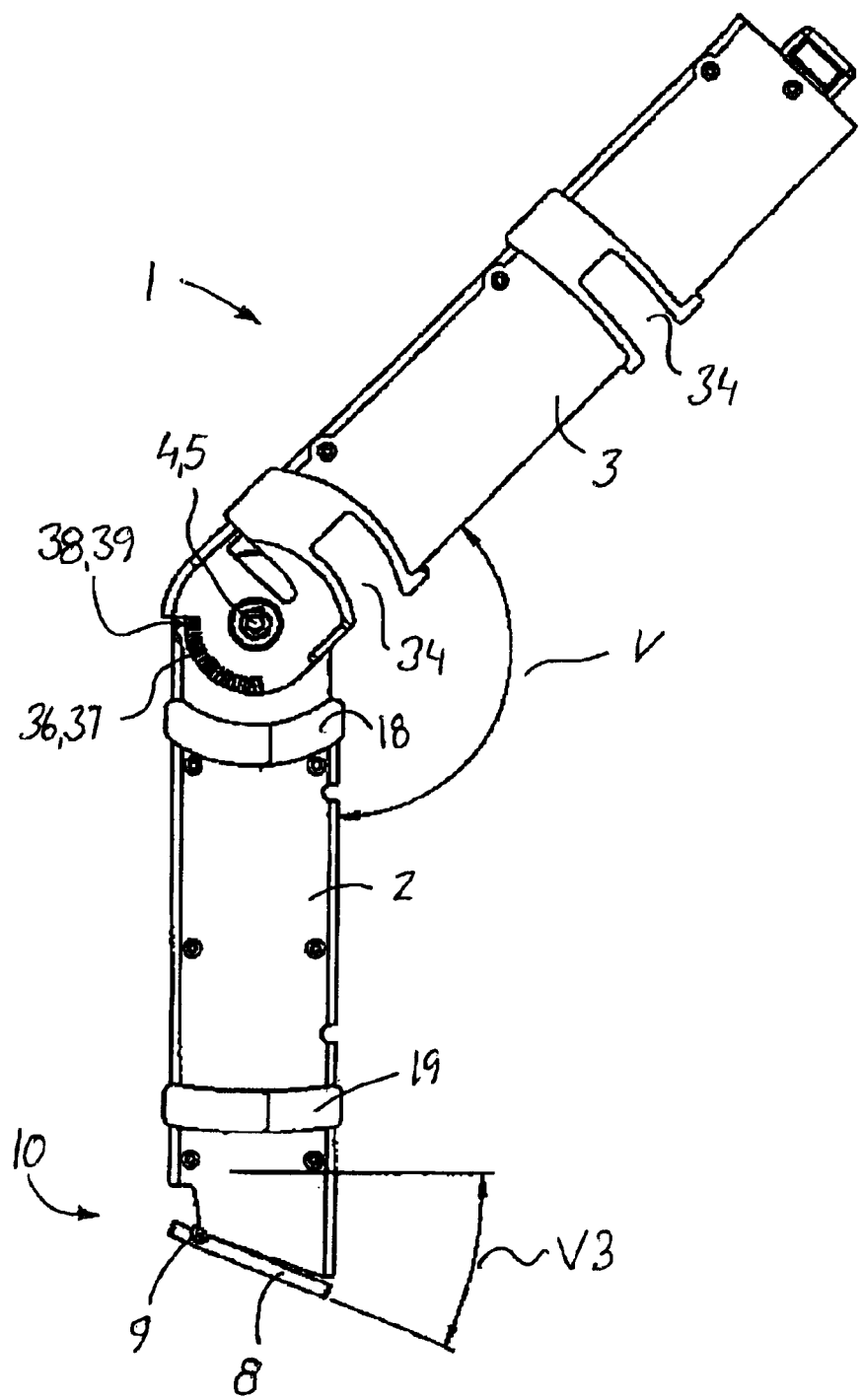

In the first embodiment shown in FIG. 1, the design includes at least one adjustment plate 8 which is arranged to pivot (arranged to rotate, swing, swivel) around an axis of rotation 9 in relation to the free (distal) end 10 of either the first arm 2 or the second arm 3. In the exemplifying embodiment, the adjustment plate is connected to the first arm 2 by pivoting (rotating) means. The adjustment plate's angle V2 (as shown in FIG. 2B), in relation to the first arm's 2 longitudinal direction, and the angle V3 (as shown in FIG. 2A), in relation to the first arm's longitudinal direction, are regulated via the guide strut (stay) 12. The angle V2 is affected to show a part of angle V between the first arm 2 and the second arm 3. In the preferred embodiment, angle V2 indicates half or essentially half of the angle V between the first arm 2 and the second arm 3.

The adjustment plate 8 is via at least one bracket 11 (shown in FIGS. 6A and 6B) connected to at least one guide strut (stay) 12 in the guide strut's 12 one end 13 or the end's proximity. The guide strut 12 is comprised of an elongated body which at its other end 14 or end's proximity is connected to at least one bracket 15 (at the axis of rotation that joins the first arm 2 and the second arm 3) in the second arm. The design of the adjustment plate 8 and the guide strut 12 may in alternative embodiments be of another for the purpose suitable shape (form) than the ones shown in FIGS. 5A and 5B.

Figure 3D:
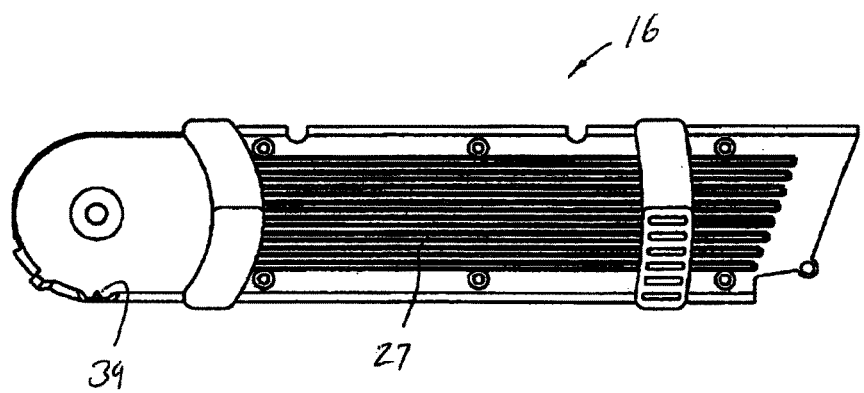
FIGS. 3D to 3F show the first lid of the inner box.
Figure 3E:
Figure 3F:
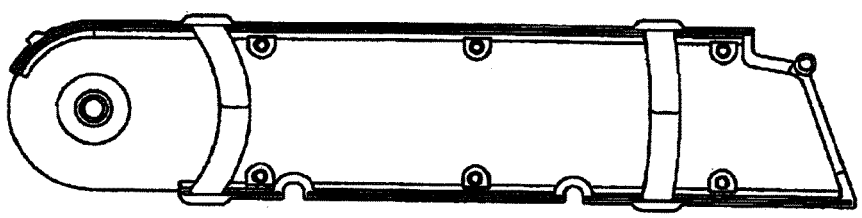

The free (distal) end 10 of the first arm (box) 2 is, in the exemplifying embodiment angled according to angle V4 (shown in FIG. 3A) in relation to the first arm 2. The gradient (scale of degrees) of angle V4 may vary within the scope of the present invention. Angle V4 is adjusted according to the maximum angle to be measured with the device. In alternative embodiments the angle may deviate from the given angle interval.

In the exemplifying embodiment, the first arm 2, even designated the inner box, is made up of at least one first half (lid) 16 and at least one second half (lid) 17 which are connected (joined) to each other by the forming of at least one interior space between the first half 16 and the second half 17. The first lid 16 and the second lid 17 may be connected (joined) to each other via screws (not shown in the figures) and/or quick couplers (fasteners) or the like. In alternative embodiments, they may be connected with other for the purpose suitable devices.

The first lid 16 and the second lid 17 each include at least one first protruding segment (male part) 18 and preferably at least one second protruding segment (male part) 19. The segments 18 and 19 protrude out a distance (height) 20 from the surface 21 of the lids. This distance 20 creates, during actuation of the device at the angle V to be measured, a space for a hand when it is gripped by a hand.

In alternative embodiments, the segments along their lengths in the first arm's cross-direction (arc shape) have a first section 22 with a shorter distance 20 and a second section 23 which has a longer distance 20.

The segments 18 and 19 have a width 24 that is partitioned by a first wall 25 and at least one second wall 26. The walls 25 and 26 of the segments have the shape of a circular arc (radius form), i.e. that the walls along their lengths in the first arm's and the second arm's cross-section have an essentially corresponding radial distance to the axis of rotation 5.

In alternative embodiments, in accordance with the figures, the design includes details such as stiffeners (both grips and stiffeners) 27, at least one suspension device 28 (shown in FIG. 4), at least one or more recesses (cavities) 29 with more details. In alternative embodiments it is conceivable that the design may lack one or more of the mentioned design details.

Figure 4F:
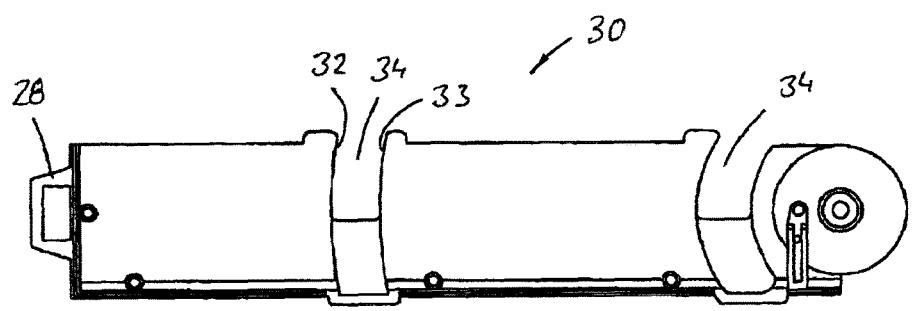
FIGS. 4D to 4F show the first lid of the outer box.
Figure 4E:
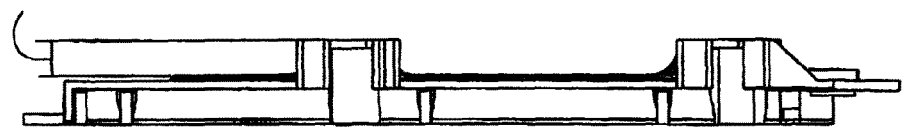
Figure 4D:
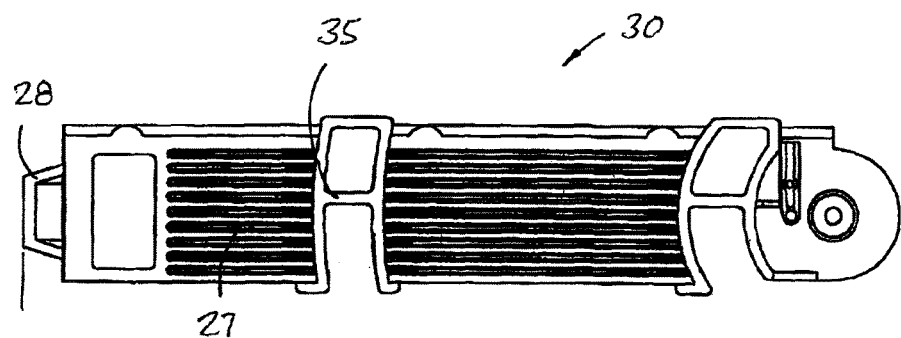

In the exemplifying embodiment, the second arm 3, even designated the outer arm, consists of a box or housing (that in a combined position with the first arm partially encompasses the first arm). The second arm 3 in the exemplifying embodiment as shown in FIGS. 4A to 4C is made up of at least one first lid (first part) 30 (shown in FIGS. 4D to 4F) and at least one second lid (second part) 31 (shown in FIGS. 4G to 4I) which are connected (joined) to each other. The second arm (box) 3 is open in the one direction, which when joined with the first arm 2 is directed in the direction of rotation against this, so that the first arm 2 completely or partially may be inserted into the second arm 3. The first lid 30 and the second lid 31 may be connected (joined) to each other with screws and/or quick couplers or the like (not shown in the figures). In alternative embodiments, they may be connected (joined) with other for the purpose suitable devices.

In the exemplifying embodiment, the second arm 3 includes at least one space (groove, cavity, recess) 34 that is formed by at least one first cross-sectional wall 32 and at least one second cross-sectional wall 33. The walls 32 and 33 stretch a distance 20 from the surface of the first lid 30 and the second lid 31. The distance 20 during use of the device creates a space for the hand so that the device is easier to use. The design forms a recess (space, cavity, female part) suitable for at least one segment to be inserted into, completely or partially. The walls 32 and 33 have the shape of part of a circular arc i.e. that they have a similar radial distance to the axis of rotation 5. In the exemplifying embodiment, the interior space is partitioned via an intermediate wall 35, stop or the like. The walls' 32 and 33 length in the second arm's 3 cross-direction may vary within the scope of the present invention.

In the exemplifying embodiment, at least one of the lids 30 and 31 includes at least one device (unit) 36 for reading the angle between the first arm 2 and the second arm 3. In the exemplifying embodiment of the device, it consists of at least one protractor 37 which is integrated with the lid or attached to or at the lid. The design includes at least one indicator 38 such as an indicating arrow 39 or the like. In the exemplifying embodiment, the design includes at least one first arrow, at least one second arrow and at least one third arrow.

A specific function of the present device 1 is that it includes at least one adjustment plate 8 whose angle V2 in relation to the first arms 2 longitudinal direction indicates half of the angle V between the first arm 2 and the second arm 3. The adjustment plate 8 with its angle V2, i.e. half of the angle between the first arm 2 and the second arm 3, is used for the adjustment of cutting equipment with which one of the moldings is cut. In alternative embodiments, the angle V2 may indicate another angle than half of the angle.

Figure 5A:
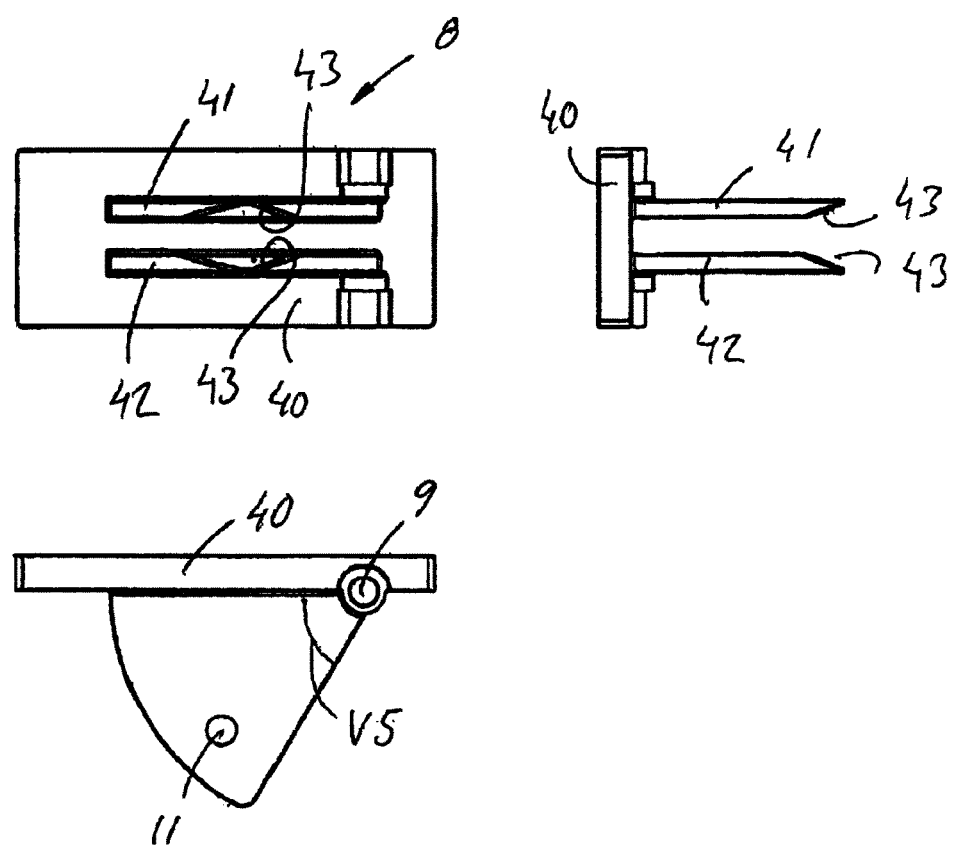
FIG. 5A shows an exemplifying embodiment of an adjustment plate.
Figure 5B:
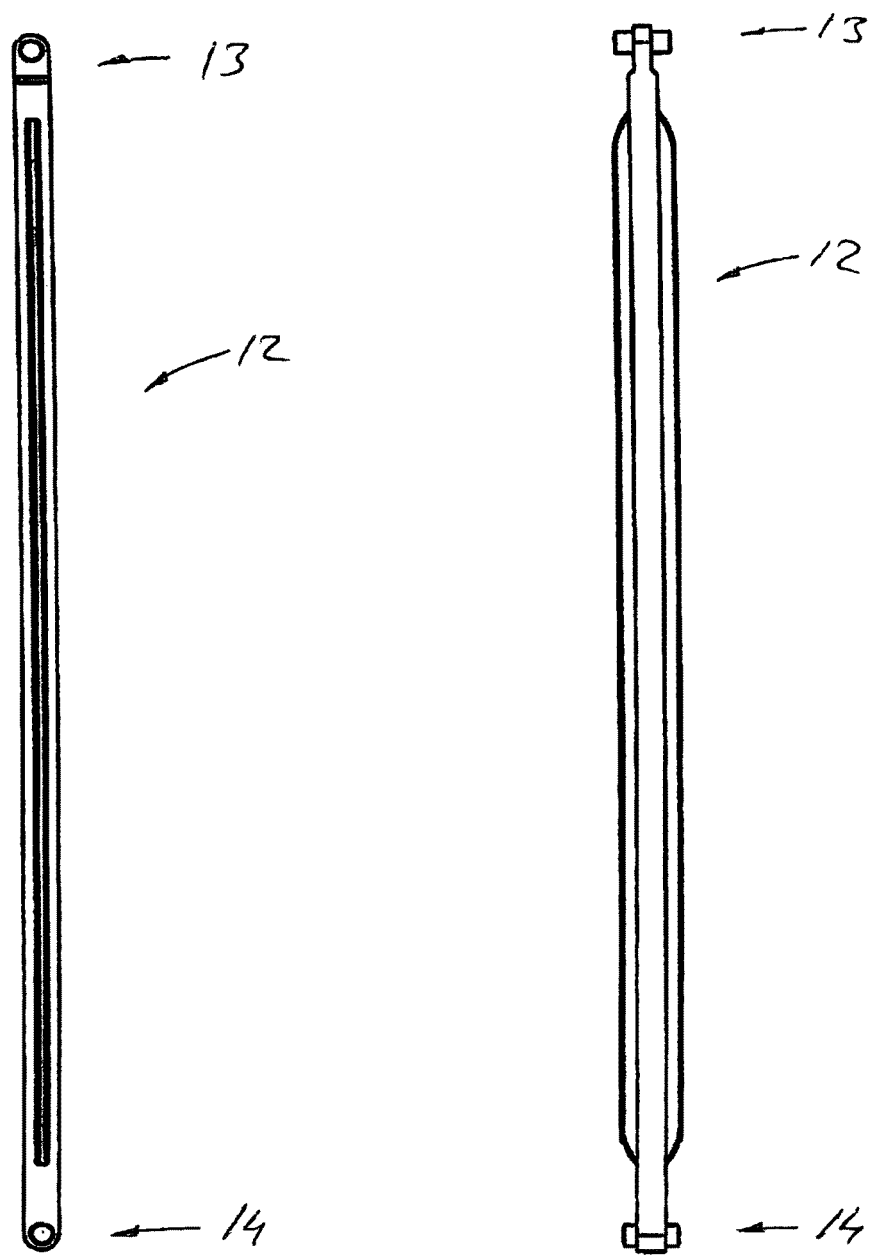
FIG. 5B shows an exemplifying embodiment of a guide strut.

An exemplifying embodiment of the adjustment plate 8 is shown in FIGS. 5A to 5C. In the exemplifying embodiment, the adjustment plate includes at least one plate 40. The adjustment plate 8 includes at least one bracket 11 in (at, to or on) which the guide strut 12 is connected. The bracket is placed at a radial distance from the axis of rotation 9. The radial distance between the bracket 11 and the axis of rotation is adjusted so that V3 becomes the intended measurement in relation to angle V. In the exemplifying embodiment of the bracket 11, it includes at least one first segment 41 and at least one second segment 42, which at a distance between them are connected to the plate 40. In the exemplifying embodiment, the bracket consists of (is comprised of, includes) at least one first hole in the first segment and at least one second hole in the second segment. The holes are an anchorage for pins (taps) in the guide strut, which are pivotally connected to the holes in the segment. The segments 41 and 42 are connected to or integrated with the plate. In the exemplifying embodiment, the segments are in their free sections angled according to angle V5. Angle V5 makes it easier for the guide strut to be connected to the segments.

In the exemplifying embodiment, the guide strut's bracket includes pins (taps) which are inserted into holes in segments 41 and 42. The axis of rotation is created by pins which are inserted into holes or similar. Segment 41 and 42 have in the direction toward one another bevels (partially beveled surfaces) 43 which ease the insertion of the guide strut's pins into the holes in conjunction with the mounting (connection, joining) of the guide strut to the adjustment plate.

Figure 6A:
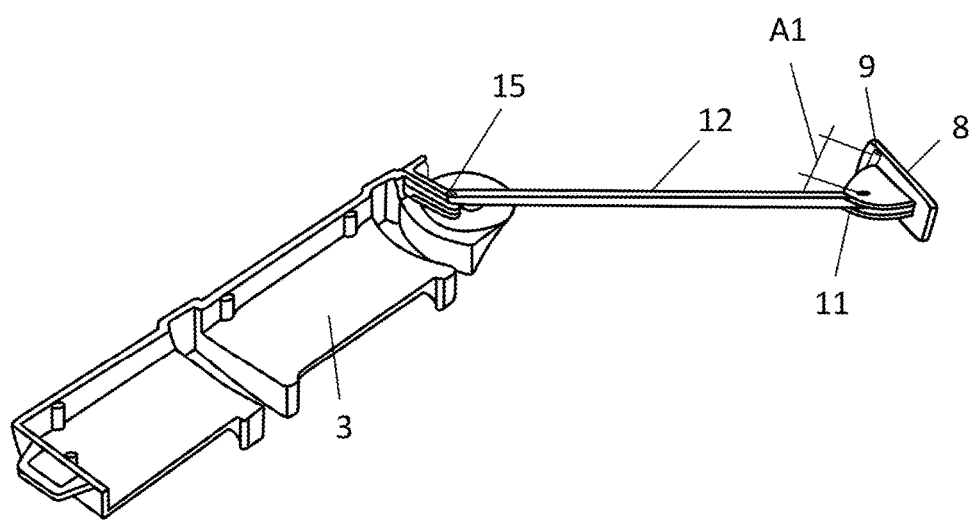
FIGS. 6A and 6B show the guide strut connected to brackets in the adjustment plate and the second arm.

With reference to FIG. 6A (details have been omitted for the purpose of clarity), is shown how the guide strut 12 is in its one end connected to the bracket 11 in the adjustment plate 8. The guide strut 12 is arranged to pivot (swing, turn) in relation to the bracket 11. The bracket is positioned at a distance A1 in relation to the adjustment plate's 8 axis of rotation 9. It is even shown in the figure how the adjustment plate 8 in its other end is connected via the bracket 15 to the second arm.

Figure 6B:
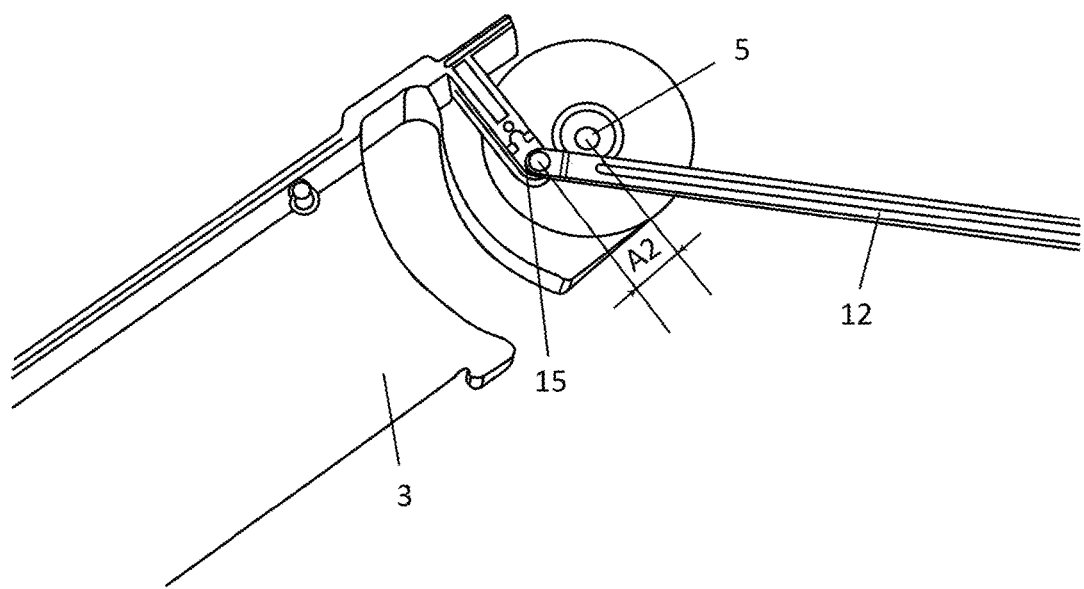

With reference to FIG. 6B, is shown in an enlarged view (somewhat askew) how the guide strut is pivotally connected to bracket 15 in the second arm 3. The bracket is positioned at A2 in relation to the axis of rotation 5. The radial distance A2 between bracket 15 and the axis of rotation 5 are dependant of distance A1 between the bracket 11 and the axis of rotation 9. Distances A1 and A2 are mutually adjusted so that the mutual angle V between the first arm and the second arm via the guide strut 12 is conveyed to the adjustment plate 8 and there indicates angle V2. Angle V2 indicates a part of angle V. Preferably, the adjustment plate's angle V2 indicates (shows) half or essentially half of angle V (the angle between the first and second arm). The distance between the bracket 15 and the axis of rotation 5 are also adjusted according to the distance between the bracket and the axis of rotation 9.

Method for Use of the Device in Accordance with the First Embodiment

When utilizing the device in accordance with the first embodiment, the angle is measured by the first arm's 2 and the second arm's 3 contact surfaces being lain against the surfaces adjacent the corner or similar whose angle or angles are to be measured. After this, when needed, the angle which is indicated by the angle measuring device is read. After this the device is moved to cutting (processing, mitering) equipment (device) such as for example a cutting machine. The device at this cutting machine is used to adjust at least one cutting angle.

Advantages of the Invention

The present invention achieves several advantages. The most important advantage is that at least one of the above mentioned disadvantages are eliminated or minimized.

The invention claimed is:
1. A device for angle measurement comprising:
a first arm having a first surface and a first end and an opposing first distal end,
a second arm having a second surface and a second arm end and an opposing second distal end,
the first end pivotally connected to the second arm second end;
the first surface and second surface defining, between them, a changeable mutual angle;
an adjustment plate pivotally connected to the first arm at the first distal end and defining an adjustment plate angle with respect to the first surface;
an elongated strut having a first and second strut end, the first strut end pivotally connected to the adjustment plate and the second strut end pivotally connected to the second arm;

such that the magnitude of the adjustment plate angle remains a predetermined fraction of the magnitude of the mutual angle if the mutual angle is changed.

2. A device, according to claim 1, and wherein:

the magnitude of the adjustment plate angle is equal to one half the magnitude of the first angle.

3. A device, according to claim 1, and wherein:

the first arm has an interior space extending from the first end to the first distal end;

the adjustment plate includes a bracket extending into the interior space;

the strut connected to the bracket and extending through the interior space to the second arm.

4. A device, according to claim 3, and wherein:

the first arm comprises two mating portions secured together and forming the interior space.

5. A device, according to claim 1, and wherein:

the first and second arm together have an adjustable indicator configured to display the magnitude of the first angle.

\* \* \* \* \*